US006681317B1

(12) United States Patent
Mathews

(10) Patent No.: US 6,681,317 B1
(45) Date of Patent: Jan. 20, 2004

(54) METHOD AND APPARATUS TO PROVIDE ADVANCED LOAD ORDERING

(75) Inventor: Gregory S. Mathews, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 09/677,228

(22) Filed: Sep. 29, 2000

(51) Int. Cl.$^7$ .......................... G06F 12/16; G06F 9/312
(52) U.S. Cl. ..................... 712/203; 712/207; 712/216; 712/225; 712/228
(58) Field of Search ............................... 712/207, 216, 712/225, 228, 203

(56) References Cited

U.S. PATENT DOCUMENTS

| | | | | |
|---|---|---|---|---|
| 5,420,990 A | * | 5/1995 | McKeen et al. | 712/216 |
| 5,420,991 A | * | 5/1995 | Konigsfeld et al. | 711/150 |
| 5,542,075 A | * | 7/1996 | Ebcioglu et al. | 717/151 |
| 5,634,023 A | * | 5/1997 | Adler et al. | 712/244 |
| 5,758,051 A | * | 5/1998 | Moreno et al. | 714/2 |
| 5,848,256 A | * | 12/1998 | Call et al. | 712/216 |
| 5,931,957 A | * | 8/1999 | Konigsburg et al. | 714/48 |
| 5,961,636 A | * | 10/1999 | Brooks et al. | 712/228 |
| 6,370,632 B1 | * | 4/2002 | Kikuta et al. | 711/205 |
| 6,484,254 B1 | * | 11/2002 | Chowdhury et al. | 712/216 |
| 6,505,296 B2 | * | 1/2003 | Morris et al. | 712/244 |
| 6,542,988 B1 | * | 4/2003 | Tremblay et al. | 712/225 |
| 6,598,156 B1 | * | 7/2003 | Arora | 712/244 |

FOREIGN PATENT DOCUMENTS

| | | |
|---|---|---|
| EP | 1 150 202 A2 | * 10/2001 |
| WO | WO 01/67239 A2 | * 9/2001 |

* cited by examiner

Primary Examiner—William M. Treat
(74) Attorney, Agent, or Firm—Blakely, Sokoloff, Taylor & Zafman LLP

(57) ABSTRACT

An apparatus and method to provide ordering when an advanced load address table is used for advanced loads. An advanced load address table (ALAT) is used to retain an entry associated with a location accessed by an advanced load instruction. The entry is utilized to determine if an intervening access to the location is performed by another instruction prior to the execution of a corresponding checking instruction. Ordering is maintained to ensure validity of the entry in the ALAT, when the advanced load instruction is boosted past an ordering setting boundary.

29 Claims, 5 Drawing Sheets

METHOD AND APPARATUS TO PROVIDE ADVANCED LOAD ORDERING

BACKGROUND OF THE INVENTION

1. Field of the Invention

The present invention relates to the field of processors and more particularly to a technique for providing ordering when utilizing an advanced load instruction.

2. Description of the Related Art

Processor instruction sets for a computer system may incorporate the use of advanced loads to improve processing performance. When a processor instruction set utilizes an advanced load feature, a specialized instruction or instructions is/are utilized to boost the ordinary load instruction to be performed at a earlier time than originally scheduled. As a typical example, when an advanced load is executed, it allocates an entry in a structure called the advanced load address table (ALAT) and the load instruction is boosted to occur at a earlier time in the instruction sequence. At the location of the original load instruction, some form of load checking instruction is inserted to confirm that the entry of the advanced load is still valid. That is, the original load instruction is replaced by an advanced load instruction, which occurs earlier in the instruction sequence, and a separate checking instruction is inserted at the original location of the load instruction to check or confirm that the entry of the advanced load instruction is still valid at the location where the original load instruction was scheduled. Advanced load instructions are available in various forms, including integer advanced loads, floating point advanced loads and floating point pair advanced loads.

When an advanced load instruction is executed, it allocates an entry (typically, an address tag) in the ALAT. Later, when a corresponding check instruction is executed to check the validity of the advanced load entry, the presence of the tag entry in the ALAT indicates that the data speculation of the advanced load has succeeded. Otherwise, the advanced load has failed and a predetermined type of recovery is performed in order to retrieve (load) the appropriate valid data (or value). Data obtained by the advanced load instruction may not be the correct value (i.e. it differs from the value that would have been obtained), had it been executed as a load at the original position. For example, after an advanced load instruction loads a data from a selected memory location, an intervening store instruction may store a different data to the same memory location. In this instance, memory location corresponding to the loaded data of the advanced load is modified by the subsequent store to that memory location and if the load had been executed at the original position, the modified data would have been obtained. In order to keep track of such changes to memory locations, an ALAT is used to maintain a list of advanced load locations and a subsequent corresponding check instruction checks the ALAT to determine if a location specified by the advanced load entry may have been modified.

Thus, when the advanced load instruction is executed, an entry is placed in the ALAT to identify the location of the advanced load access. The subsequent advanced load checking operation looks for an entry in the ALAT and if the entry is present, then the advanced load operation is still deemed to be valid. However, if an intervening instruction which could modify the memory location, such as an intervening store instruction, to the same corresponding memory location occurs, then the entry is removed from the ALAT. When the subsequent checking is performed for the advanced load entry in the ALAT, the absence of the entry signifies that the data of the memory location may have been changed. The system then responds based on the particular checking instruction utilized.

For example, a check load instruction can be used for reloading the data. The check load searches the ALAT for a matching entry and, if found, the speculative operation of the advanced load is determined to be successful and the check load instruction is ignored. If a matching entry is not found, the speculation is deemed to be unsuccessful and the check load loads the data from the memory location, as though the advanced load instruction never existed.

Another checking instruction is an advanced load check instruction, which is used as a speculation check. If the speculation of the advanced load is successful, the execution continues and no recovery is necessary. However if the speculation was unsuccessful, in that the matching entry in the ALAT is found, the advanced load check instruction causes a branch to a recovery routine. The recovery routine contains instructions to respond to the failure of the advanced load.

Although a variety of advanced load and ALAT schemes are known, none are known to operate with processor ordering semantics. Current ALAT schemes are utilized in a single processing environment in which a set of instructions operate on a single processor. The advanced load instruction, is a speculative operation performed out of order from the original load instruction location, but it is still constrained by the instruction sequencing constraints imposed on the system. However, when system ordering constraints are imposed, such as when multiple processors are present in a system, the ALAT should also conform to such ordering constraints. For example, when multiple processors have access to a shared memory location, certain ordering constraints are imposed on the processors to ensure ordering.

Ordering constraints are used to guarantee that single and multiple processor systems will operate with predictable results when executing dependent accesses to possibly similar locations. For example, for two processors executing a code sequence where processor 0 was executing a store to memory location A followed by a store to memory location B (ensured by ordering constraints) and processor 1 was executing a load from memory location B followed by a load from memory location A (ensured by ordering constraints), then it would follow that if the load from B returned the data stored to B, the load from A should return the data stored to A. Since advanced loads perform a load operation on a memory location, the advanced loads should also take into consideration these dependencies.

Accordingly, in order to abide by the access ordering semantics, the advanced load and ALAT operations should abide by the access ordering semantics. The present invention provides for ALAT ordering.

DETAILED DESCRIPTION OF THE INVENTION

Figure 1:
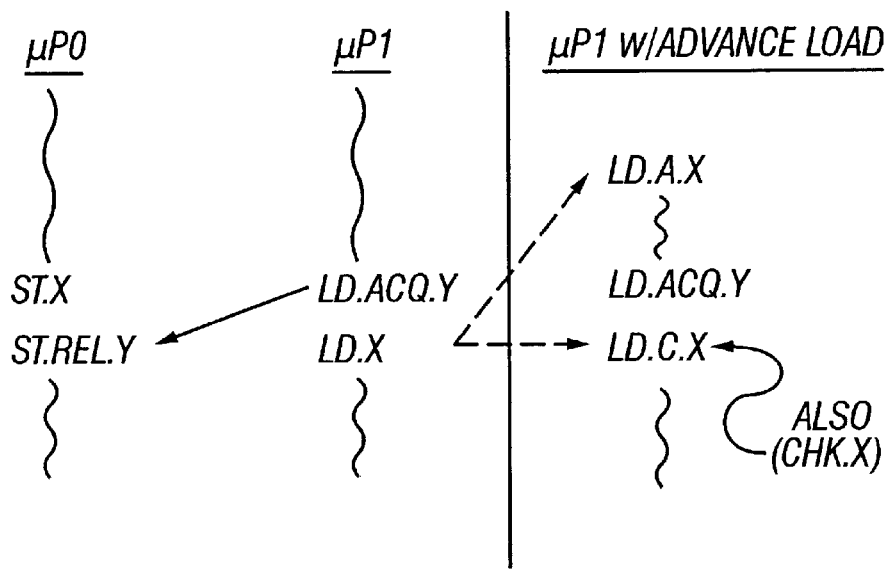
FIG. 1 illustrates an embodiment of the present invention in which an advanced load instruction is used in a multiple processor system and in which the advanced load is boosted past an ordering boundary.

Referring to FIG. 1, an embodiment of the invention in which an advanced load is utilized with an ordering scheme is shown. In the particular example of FIG. 1, two processors, shown as microprocessor P0 ($\mu$P0) and microprocessor P1 ($\mu$P1), are used to execute separate programming instructions in a multiprocessor computer system. As noted in the Background section above, when only a single processor is utilized, the location of the placement of the advanced load instruction is not a concern from an ordering perspective, since the processor is capable of maintaining the proper sequencing in retiring the instructions. However, when more than one independent instruction sequence is present, such as in the instance when two processors are present in a system or a single processor executes multiple programs, one program sequence can operate independently of the other. However, in the case that the processors share data or access shared locations (such as memory), some ordering scheme may be required to maintain ordering consistency. Accordingly, in a multiple processing environment, it is generally desirable that processor operations are made visible to the other processor or processors with consistent ordering. One of a variety of ordering schemes can be implemented, in order to ensure that ordering is maintained within the system.

One technique of maintaining ordering consistency is the use of instructions having release and acquire semantics, such as a store release (ST.REL) instruction and a load acquire (LD.ACQ) instruction. A release operation is used to ensure that instructions, such as micro architecture op-codes ($\mu$ops), preceding the release instruction will reach visibility prior to the release instruction. Equivalently, an acquire instruction ensures that those $\mu$ops following the acquire instruction reach visibility only after the acquire instruction.

An example illustration of utilizing an advanced load instruction in a multiple processor setting is illustrated in FIG. 1. In this example, the ordering between the two processors is maintained by the use of instructions having release and acquire semantics (simply referred to herein as release and acquire instructions). Furthermore, the example shows an access of a common or shared memory space designated as X, in which X corresponds to a location in memory where a value (data) is stored. In order to control the access to the shared memory space X, a flag at location Y is used to control the access. That is, the processor will need to check the flag (established at location Y) prior to accessing the shared location X and likewise the operations to the shared memory space X are completed prior to the releasing of the flag Y.

Thus, in the example, $\mu$P0 executes the instruction ST.X to store a value into the shared memory space X. Then the processor executes the instruction ST.REL.Y, which is a store release instruction to release the flag. The store release instruction stores a value into location Y, whose value indicates the release of the access to the shared memory location X. It is appreciated that typically the store type instruction specifies a register and the content of the register contains the address of the memory location. Thus, the "Y" would identify a register and the content of that register identifies the memory location. But, for simplicity the Y here is discussed herein as identifying the memory location the register would identify.

A separate independent set of instructions being executed by the second processor ($\mu$P1) includes a load acquire instruction (LD.ACQ). In the example, the load acquire instruction LD.ACQ.Y is used to read the flag at location Y in order to determine if the data at shared memory location X is ready. As noted in FIG. 1, the LD.ACQ.Y instruction is used to load the flag Y. Then, the LD.X instruction is used to load shared memory X. Due to the ordering of the instructions, it can be guaranteed that if the flag Y indicated the shared memory X is ready (the LD.ACQ.Y returns the value written by the ST.REL.Y) then the LD.X will return the value written by the ST.X.

Subsequently, the loaded data from location X is utilized by other instructions operating on $\mu$P1. For example, the data loaded by the LD.X instruction can be used to perform an add operation, in which the value loaded from location X is added to another value. Again, it is to be noted that the load type instruction actually specifies a register, whose content specifies the memory address.

Figure 2:
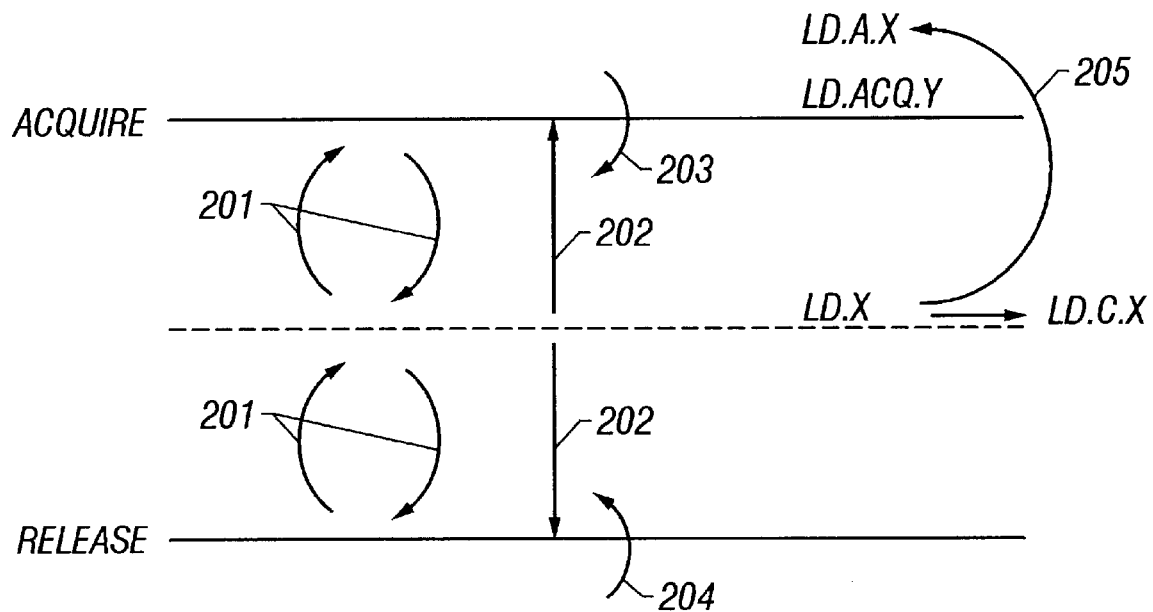
FIG. 2 illustrates a specific example for the advanced load of FIG. 1 when acquire and release ordering semantics are used to establish ordering.

It is appreciated that the use of store release and load acquire instructions ensure ordering consistency between two or more independently processed instruction sequences. An example of the use of acquire and release instructions for maintaining ordering is shown in FIG. 2. An instruction following an instruction having an acquire semantic (acquire) may not be reordered to reach visibility prior to the acquire instruction. Similarly, instructions occurring prior to an instruction having a release semantic (release) may not be reordered to reach visibility following the release instruction. Therefore, as shown in FIG. 2, the load instruction LD.X instruction may be reordered with other instructions between the acquire and release boundaries (as shown by arrows 201), but are prohibited from being reordered prior to the acquire instruction or subsequent to the release instruction (as shown by arrows 202). The ST.X instruction also follows such ordering requirements.

In one practice, the instructions between the acquire and release boundaries are referred to as weak instructions and the instructions which define the boundary are referred to as strong instructions. With the usage of acquire and release instructions, instructions preceding the acquire boundary may be reordered in reference to the acquire instruction boundary, as shown by arrow 203, and similarly instructions following the release instruction can be reordered in reference to the release boundary, as shown by arrow 204.

It is also appreciated that other boundary schemes can be implemented other than the acquire and release type instructions. For example, the acquire and release boundaries can be replaced by memory fence boundaries (fences), which typically prohibit any reordering across these boundaries in either direction. Thus, it is appreciated that the embodiment described illustrates the use of instructions having acquire and release semantics, but other schemes for establishing the boundaries for memory ordering can be implemented to practice the present invention. Also, the general use of acquire and release mechanisms to control ordering is known in the art.

Referring again to FIGS. 1 and 2, an advanced load instruction is implemented in practicing the present invention. The use of the advanced load (LD.A) instruction is illustrated in regards to the load instruction for μP1 in FIG. 1. In the particular example, the load instruction LD.X is replaced with an advanced load instruction LD.A.X and a corresponding checking instruction, such as the check load instruction (LD.C) or the advanced load check instruction (CHK). When an advanced load instruction is utilized in combination with instructions for maintaining ordering, the LD.A instruction would need to be executed following semantics established for the ordering system. Thus, when load acquire instruction is utilized to enforce the acquire semantics, the LD.A instruction would be forced to occur following the LD.ACQ instruction. This would ensure that the ordering sequence is complied with in multiprocessor environments.

Accordingly, as shown in the example of FIG. 1, if the LD.X instruction was used (instead of the advanced load) the ST.X instruction will be executed prior to the ST.REL.Y instruction to enforce the release ordering requirement and the LD.X instruction will follow the LD.ACQ.Y instruction to enforce the acquire ordering requirement. From a processor visibility stand point, it follows that the ST.X instruction will be made visible to processor μP1 prior to the execution of the LD.X instruction, if ST.REL.Y is made visible prior to the execution of LD.ACQ.Y instruction due to the ordering requirements.

When an advanced load is utilized, the prior art ordering constraints would necessarily force it to be executed after the LD.ACQ.Y instruction to maintain ordering. However, the present invention allows for the advanced load instruction LD.A to pass the boundary established by the load acquire, so that the LD.A instruction is permitted to be executed prior to the execution of the LD.ACQ.Y instruction. Thus, as shown in FIGS. 1 and 2, the advanced load instruction LD.A.X is shown preceding the acquire boundary instruction LD.ACQ.Y. At the location of the original LD.X, a checking instruction, such as the load check (LD.C.X), an advanced load check instruction (CHK.X) or other equivalent checking instruction, is inserted. As shown in FIG. 2, by arrow 205, the present invention permits the advanced load to pass the acquire boundary established by the load acquire. Permitting the advanced load instruction to bypass the acquire boundary allows for the data to be retrieved in ample time before it's usage. However, such actions would violate the requirements established for the acquire semantic, unless the ordering scheme was accounted for.

An embodiment of the invention ensures proper ordering of the advanced load by ensuring that the checking instruction reaches visibility after the load acquire instruction is made visible. In the example, it is possible that the advanced load LD.A.X is performed before the ST.X. The ALAT would invalidate the LD.A.X entry once the ST.X is made visible. But if the LD.C.X (or the CHK.X) reached visibility prior to the visibility of the LD.ACQ.Y, then it would be possible for the LD.A.X and LD.C.X (or CHK.X) to return a result before the ST.X is executed, while the later LD.ACQ.Y returned the value stored by the ST.REL.Y indicating that the data in memory location X was ready. One way to ensure this violation of ordering does not occur is to ensure that the LD.ACQ.Y is made visible prior to LD.C.X (or the CHK.X), since if the LD.ACQ.Y sees the ST.REL.Y, then the ST.X must have previously reached visibility, and if the ST.X reaches visibility before the LD.A.X, then the LD.A.X will return the correct value, and if the ST.X reaches visibility between the LD.A.X and the LD.C.X, then the ALAT entry created by the LD.A.X will be invalidated by the ST.X and the subsequent LD.C.X will re-execute the load, thereby returning the correct information.

An embodiment of the invention described below ensures that the load acquire instruction is made visible prior to the visibility of the checking instruction, so that the checking of the corresponding entry in the ALAT is guaranteed to be correct. It is appreciated that a variety of techniques can be utilized to ensure that the ordering is maintained. One way to ensure the visibility of LD.ACQ.Y prior to LD.C.X (or CHK.X) is to account for any latencies which might prevent the LD.ACQ.Y from being made visible prior to making LD.C.X visible.

Examples of possible delays are noted below. For example, if a level one (L1) and/or level two (L2) cache miss occur(s) on the load acquire instruction but a cache hit occurs on the checking instruction, the checking instruction may reach visibility prior to the load acquire. Additionally, it is possible that the two instructions may be executed at the same time in a parallel ported processor. Thus, an embodiment described below provides one technique to ensure the visibility of the load acquire instruction before the checking instruction is made visible. In the described embodiment, the load checking instruction (such as the check load or the advanced load check) is delayed until the boundary setting instruction which forces ordering (such as the load acquire) is made visible first. An alternative embodiment is to force fail the checking instruction if the boundary setting instruction is not made visible first. Another embodiment is to use both techniques.

Thus, as will be noted below, an implementation of the invention is to stall the pipeline for processing the checking instruction and/or the advanced load checking is forced to fail, so that the checking instruction is guaranteed to be made visible only after the boundary setting instruction is made visible. Accordingly, in reference to FIGS. 1 and 2, an adverse condition is noted whenever LD.C.X (or CHK.X) appears to reach visibility prior to LD.ACQ.Y reaching visibility. It is appreciated that in one embodiment, a complete force fail condition can be initiated whenever this adverse condition is noted. Force failing the checking instruction is equivalent to failing the ALAT entry check. With a check load (LD.C) instruction, the load from the memory location is performed again or in the instance of the advanced load check instruction, an interrupt/exception or a branch is made.

Figure 3:
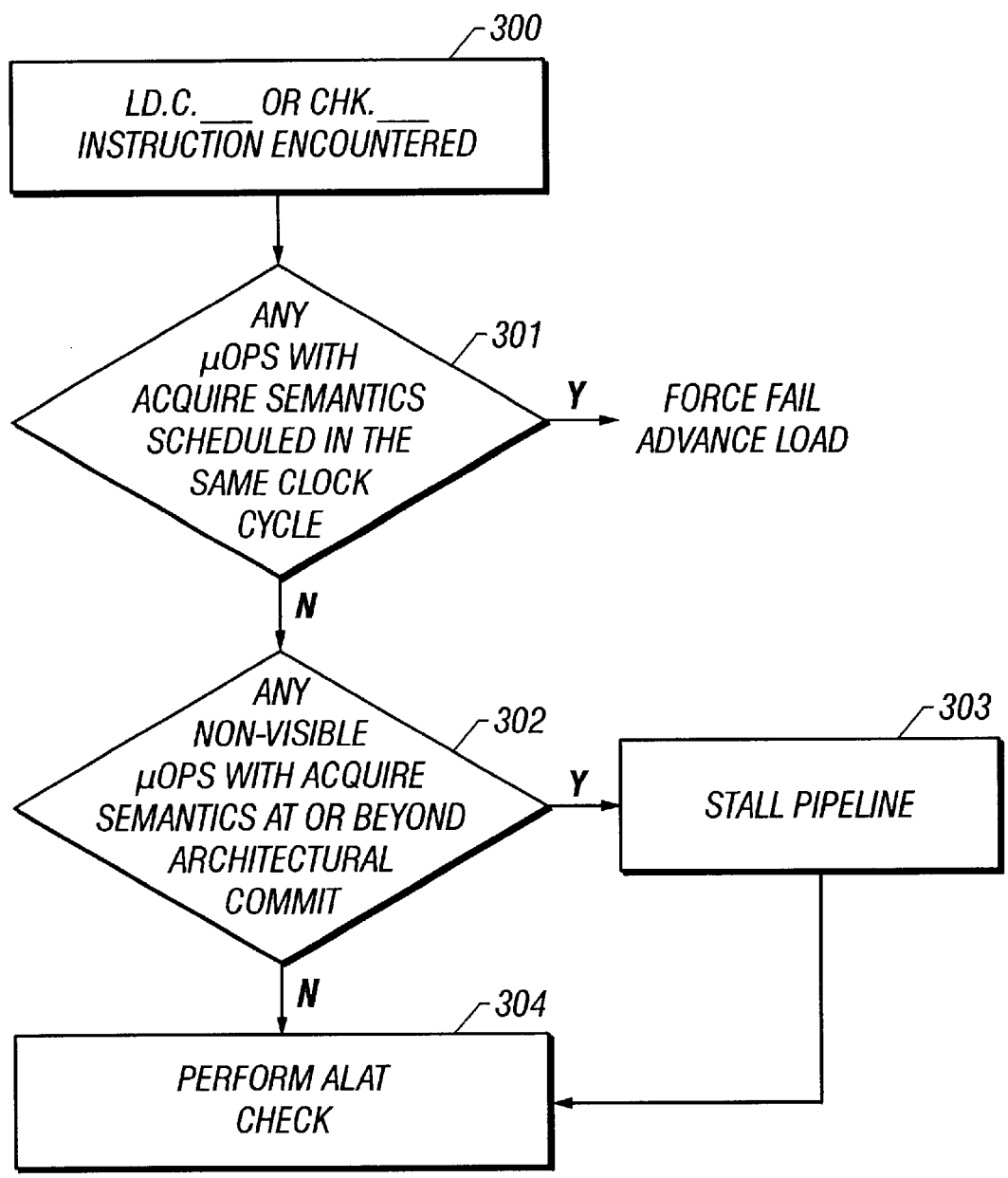
FIG. 3 is a flowchart exemplifying a stalling of a pipeline to ensure that the instruction with the acquire semantic is made visible prior to the advanced load checking instruction.

Although, force failing a checking instruction ensures that ordering is achieved, it also entails a significant time delay since all speculative instructions behind the checking instruction are flushed from the pipeline and re-executed. A more preferred response is to force fail the advanced load only if such force failure is necessary. In certain instances, it may be desirable to stall the checking instruction for a specified period of time to allow the load acquire to reach visibility. The stalling technique is acceptable where the checking instruction can be stalled but where the load acquire instruction can continue to be processed (without stalling). For example, in the previous illustration noted in which the cache misses resulted in the delay of the load acquire instruction becoming visible, the stalling technique will permit the load acquire instruction to retrieve the data from beyond the L2 level (such as from L3 cache or main memory) before the checking instruction is permitted to make a hit in the L1 cache. FIG. 3 exemplifies one embodiment for achieving the technique of insuring the ordering, so that an invalid ALAT check result is prevented from occurring.

Referring to FIG. 3, a processor monitors instructions (noted as μps) that are being executed and identifies a checking instruction (such as a check load or an advanced load check instruction) when the instruction is encountered (block 300). Presuming that a state-of-the-art super scalar processor is being utilized, in which instructions (more than one) are being processed at each given clock cycle, the processor checks to determine if any μop with an acquire semantic is scheduled previous to, but in the same clock cycle as the checking instruction (block 301). If there is a μop with an acquire semantic scheduled previous to the checking instruction, but in the same clock cycle then the checking instruction (μop) is force failed without checking the ALAT entry. Otherwise, the operation in block 302 is performed.

As shown in block 302, a detection is made to determine if there is a non-visible μop with acquire semantic at or beyond the architectural commit point. If such non-visible visible μop is noted, then the pipeline is stalled to stall the checking instruction for a predetermined number of cycles which will ensure that the non-visible μop is made visible (see block 303). For example, the checking μop can be stalled for two clock cycles which ensures that all non-visible μops occurring previous to the checking μop are made visible for performing the ALAT check (block 304). It is appreciated that the delay will be dependent on the system and that a maximum delay may be calculated or may be dynamic. Performing a stall to account for the maximum delay guarantees that the previous μop will reach visibility within that period.

Figure 4:
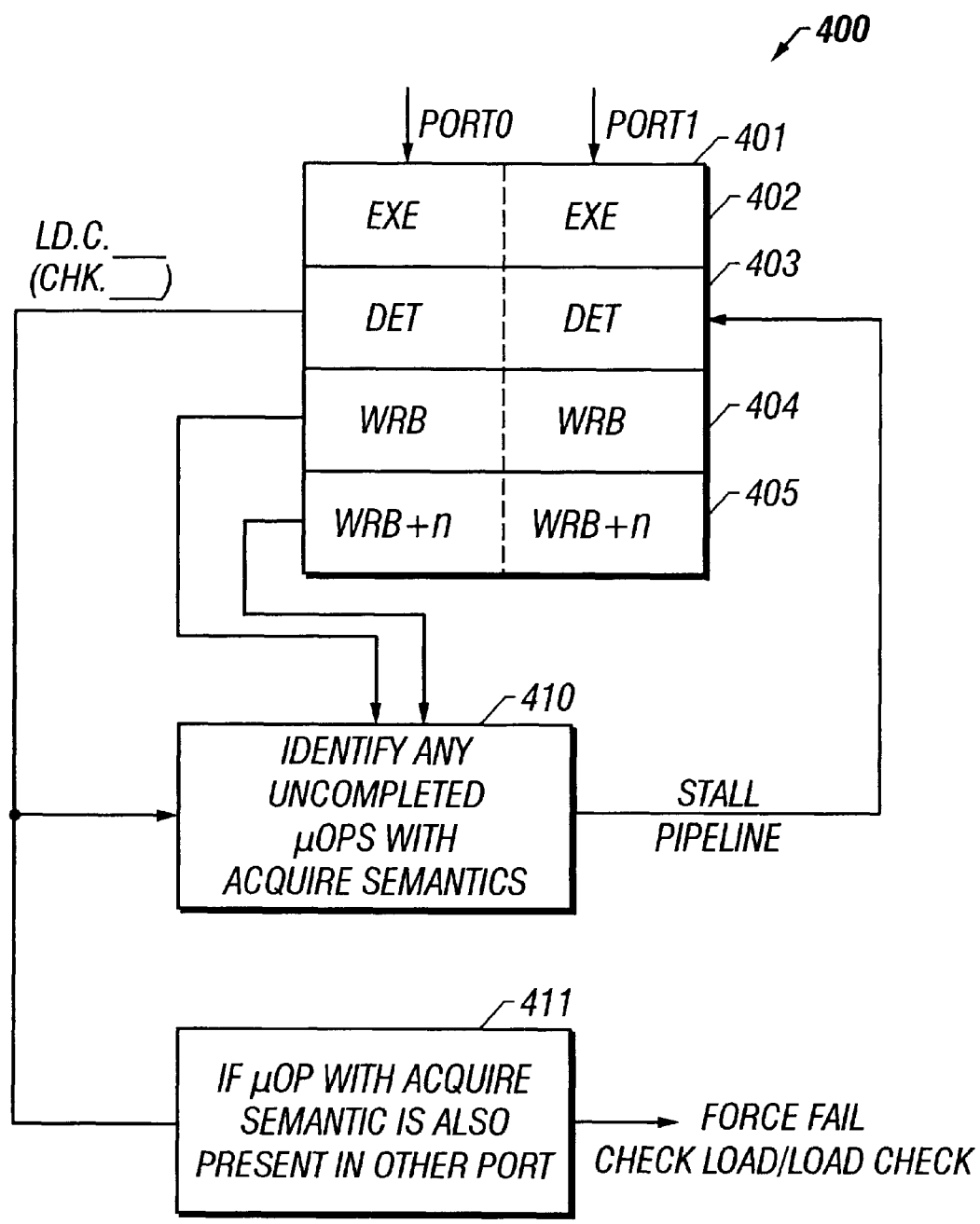
FIG. 4 is a block diagram of an embodiment of a portion of a processor which uses an advanced load instruction and a circuit to ensure that the acquire instruction used to enforce ordering is made visible prior to the checking instruction.

FIG. 4 shows an example of a structure for practicing the present invention within a processor environment. The processor architecture shown in FIG. 4 employs a dual-port structure for processing the instructions. The processor 400 has a two-port (shown as Port 0 and Port 1) instruction pipeline, in which parallel execution of the μops is performed. Each instruction port is associated with a pipeline structure 401 to process the instructions. The particular embodiment shown in FIG. 4 includes an execution block 402, a detector stage 403 and write back stages 404–405.

The execution block 402, although shown as a single block, actually comprises a number of stages for executing the μps. As will be described below, the detector stage 403 is utilized to detect for an advanced load checking instruction transitioning through the pipeline 401. The write back (WRB) stages 404–405 signify the stage or stages of the pipeline pertaining to instructions which have reached architectural commit. That is, the μops noted in blocks 404–405 have been determined to be non-speculative and architecturally committed for completion. However, as noted above, the architecturally committed μops may not have reached visibility within the system.

Accordingly, in FIG. 4, a stall unit 410 is used to identify any uncompleted μop with an acquire semantic. In this instance, as the μops transition through the pipeline 401, the detector stage 403 detects any μops which perform the advanced load checking operation. Thus, using the above example, when an LD.C.X or CHK.X instruction is detected in the detector stage 403, an indication is provided to unit 410. The unit 410 then determines if there are any pending μops with acquire semantics which have not reached visibility. If such an uncompleted μop is noted, then a stall signal is generated to stall the pipeline 401 at the detector stage 403 such that pipeline stage 403, as well as the previous stages (here shown as execution block 402) are stalled in order to allow for the uncompleted μop with the acquire semantics to reach visibility.

The stalling cycle could be designed so that the pipeline resumes functioning to transition the instructions once the uncompleted acquire μop reaches visibility or, alternatively, the stall may be provided for a predetermined number of clock cycles corresponding to the worst case delay encountered in transitioning an architecturally committed micro op to reach visibility.

It is possible that when the advanced load checking μop is detected within the detector stage 403, a previous μop with an acquire semantic could also be at the same detector stage 403. This is possible since there is more than one path for executing the instructions. Thus, an advanced load checking μop may be detected at one port of stage 403 and the other port of the same stage 403 may have a μop having acquire semantics. This is possible in the instance when LD.C.X is executed just following LD.ACQ.Y, so that both instructions are processed at the same stage, such as that shown in FIG. 4. In this instance, a specialized detection unit 411 is utilized to detect if checking μop and a previous acquire μop are detected within the detector stage 403. If detector unit 411 detects such a condition, then it will take a certain response depending on the design of the pipeline 401.

Generally, without regard to a specialized condition, unit 411 will force fail the checking instruction to ensure that it will not reach visibility at all. A specialized condition may exist if each port of the pipeline could be stalled separately. In that event, the port containing the checking μop could be stalled, while the other port containing the previous load acquire μop can continue to execute and transition through the write back stage 404. Once the acquire μop reaches visibility or is guaranteed to reach visibility before the checking μop, then the stalled portion of the pipeline could then be unstalled to permit the checking μop to continue transitioning through the pipeline.

It is appreciated that the above description describes the operation of the pipeline 401 in reference to the use of an instruction having an acquire semantic following an ordering consistency model, such as a processor ordering consistency model. Accordingly, if the advanced load checking μop is a weakly ordered op then its order with respect to other weakly ordered ops following the μop with the acquire semantic is not of concern. It is only with respect to the μop having the acquire semantic that there may be a visibility issue which could result in the incorrect use of the ALAT. It is further appreciated that if other ordering consistency models or different boundary instructions are utilized (such as the use of a memory fence for setting boundaries), then the pipeline would need to be adapted for use with such embodiments. In this instance, the technique for applying the invention is described in reference to establishing ordering boundaries based on acquire and release models.

Figure 5:
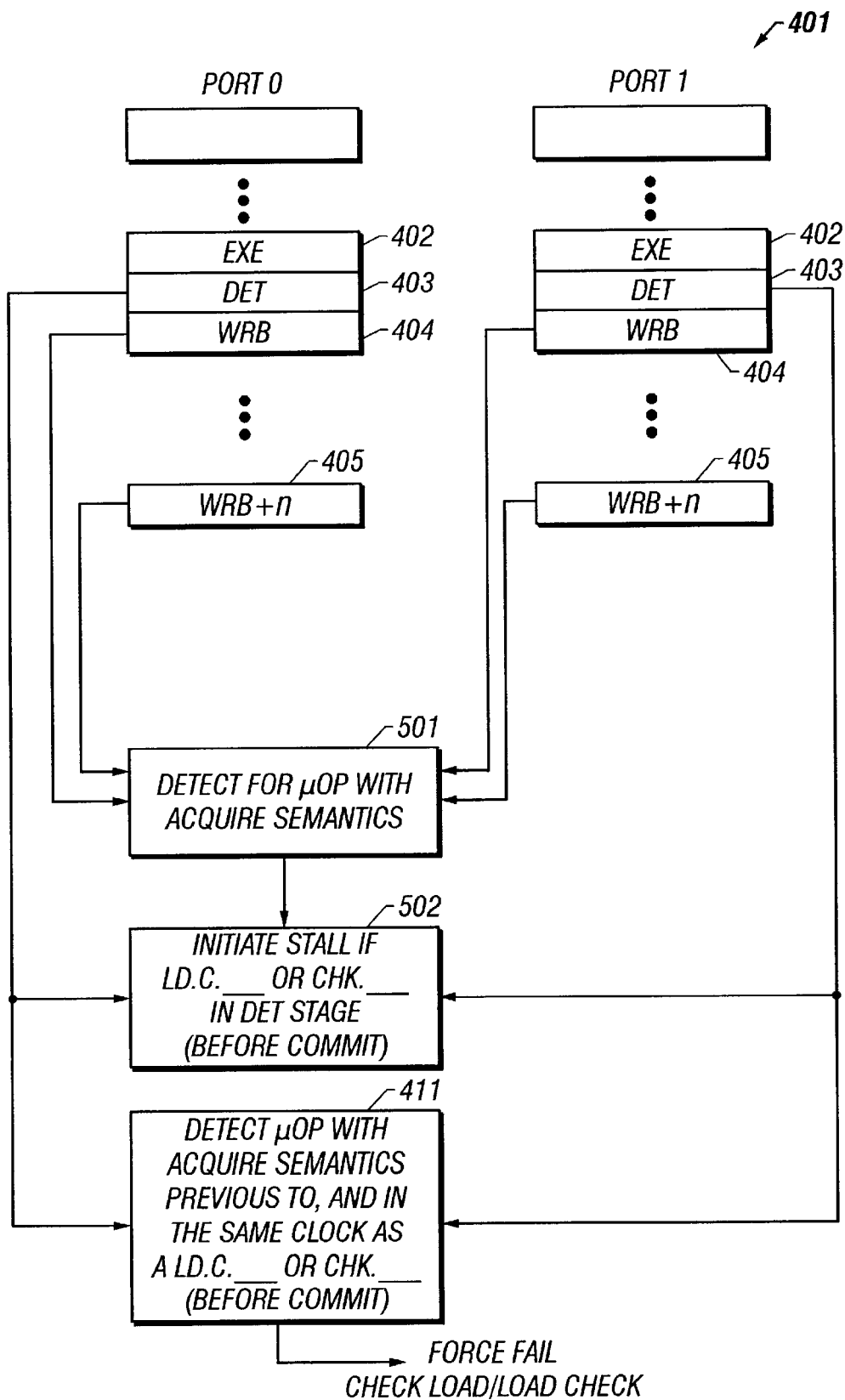
FIG. 5 is a block diagram of an embodiment equivalent to FIG. 4, but in which the detection is made earlier in a pipeline structure.

FIG. 5 shows a particular embodiment implementing the structure of FIG. 4. In FIG. 5, the WRB pipeline stage represents the point of architectural commit, that is the point at which it is guaranteed that a μop will be completed (although the latency of completion is still indeterminate). The DET stage represents the last pipeline stage before architectural commit where a μop may be canceled. The WRB+n pipeline stage represents a point of variable latency where a μop is completed or reaches visibility.

In operation, the WRB to WRB+n stages are checked for any μop having an acquire semantic which had not yet reached visibility (unit 501). If unit 501 detects a μop with an acquire semantic that has not reached visibility in pipeline stages WRB–WRB+n, it will send a signal to unit 502. In this case, when an advanced load checking μop or check load μop is detected in the DET stage 403 by unit 502, a signal is generated to stall the advanced load checking or check load μop in the DET stage until the acquire μop reaches visibility.

The technique of the embodiment of FIG. 5 also performs the function of looking at the detector stage for the presence of both a previous μop with acquire semantics and a subsequent μop having the advanced load checking operation in the same stage and force failing the advanced load check/check load if both are detected. Again it is appreciated that the particular structure of FIG. 5 can be readily adapted for use with other ordering schemes.

Figure 6:
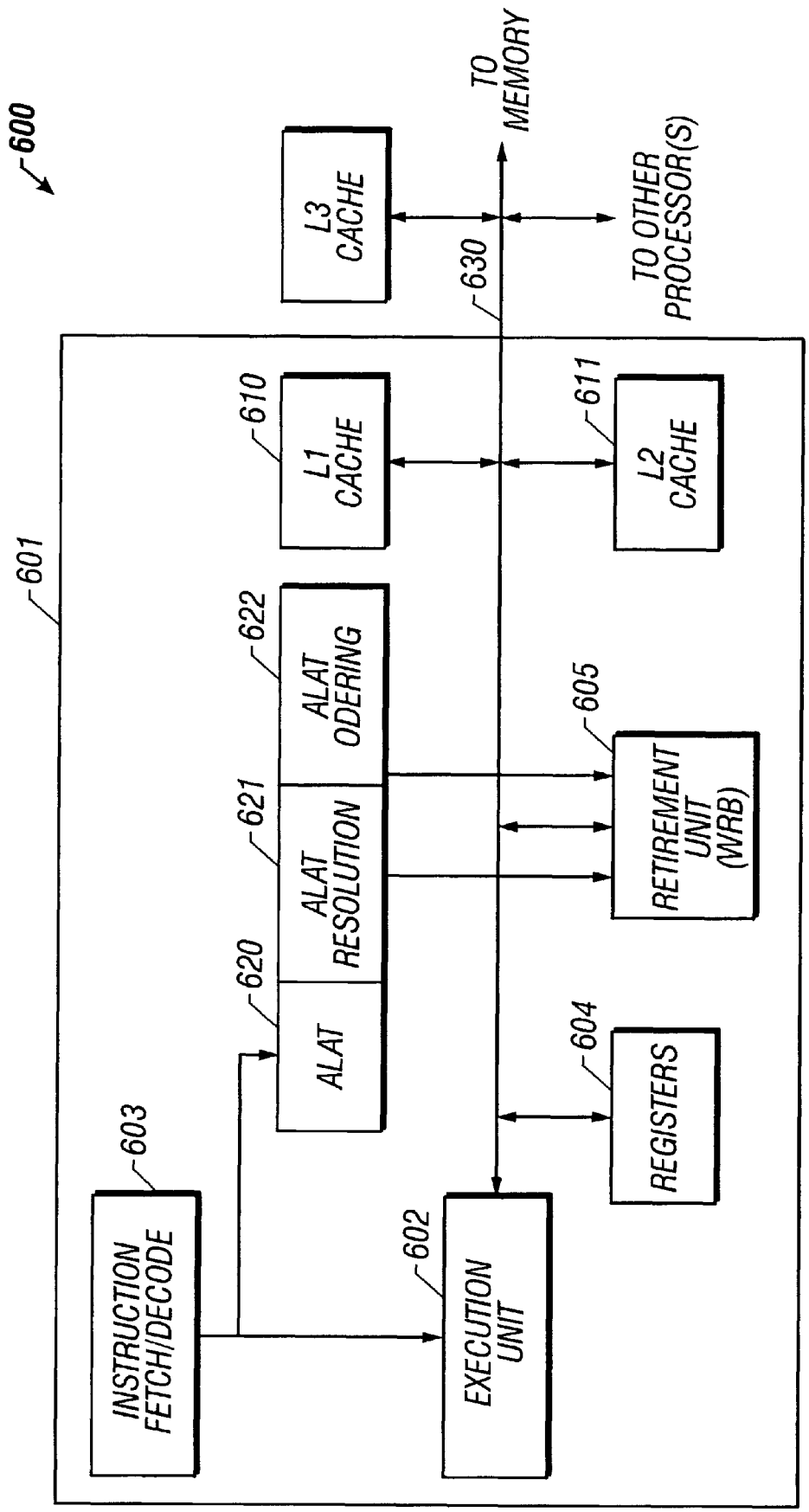
FIG. 6 is one example block diagram of a multiprocessor computer system having a processor which includes the invention to perform ALAT ordering.

Referring to FIG. 6, one typical system embodiment for practicing the invention is shown. A computer 600 is shown, in which a processor 601 functions as one of a plurality of processors. Typically the processor 601 is embodied in a single integrated circuit chip. In a general layout, processor 601 is comprised of an execution unit 602, instruction fetch and decode unit 603, set of registers 604, a retirement unit 605. Processor 601 also includes a cache memory, shown as a level 1 (L1) cache 610 and a level 2 (L2) cache 611. It is appreciated that the configuration of the cache memory as well as the number of levels of cache memory is a design choice and may depend upon the processor architecture.

Also, included within the processor 601 are the structures which comprise the handling of the advanced load function. Accordingly, a table known as an ALAT 620 is included to retain the entries when the advanced load instruction is executed. Associated with the ALAT is an ALAT resolution circuit 621 to resolve the search and validation function performed when the advanced load checking instruction is executed. Also associated with the ALAT 620 is an ALAT ordering unit 622 which includes the circuitry shown in FIGS. 4 and 5 for insuring that the memory boundary instructions maintain ordering by guaranteeing the validity of the ALAT entries. Thus, the ALAT ordering unit 622 provides the functions described in reference to maintaining the ordering when an advanced load instruction is boosted to a position ahead of the load acquire or other boundary setting instructions. It is appreciated that a variety of known techniques can be used to provide the circuitry and/or software to perform the function of unit 622.

Also shown in FIG. 6 is a bus 630 which is coupled to a memory (such as a random access memory, RAM) which may include the shared memory space. Other processors of a multiprocessor system (although not shown) are coupled to bus 630 for access to the shared memory space. Also shown coupled to bus 630 in FIG. 6 is a third level cache (L3) which could be utilized as an individual cache for processor 601 or incorporated for use as a shared cache by the plurality of processors coupled to bus 630 in accessing the memory. Accordingly, both L3 cache and the main memory can be configured as shared memory space. Thus, it is appreciated that a variety of configurations can be adapted for use as a multiple processor system and that the system shown in FIG. 6 is illustrated for exemplary purpose only. Furthermore, it is to be noted that the present invention could be utilized in a single processor environment where ordering is required or desired.

I claim:

1. An apparatus comprising:
   a table to retain an entry associated with a location accessed by an advanced load instruction, the entry utilized to determine if an intervening access to the location is performed by another instruction prior to a corresponding checking instruction to the advanced load instruction is executed; and
   an advanced load ordering unit coupled to said table to ensure that ordering is maintained when the advanced load instruction is boosted past an ordering setting boundary instruction.

2. The apparatus of claim 1 wherein said advanced load ordering unit determines if the boundary instruction has not reached visibility when the checking instruction is executed.

3. The apparatus of claim 2 wherein said advanced load ordering unit stalls the checking instruction until the boundary instruction is guaranteed to reach visibility prior to the checking instruction reaching visibility.

4. The apparatus of claim 2 wherein said advanced load ordering unit causes the checking instruction to fail if the boundary instruction has not yet reached visibility.

5. The apparatus of claim 1 wherein said advanced load ordering unit detects the boundary instruction and then determines if the checking instruction is present in an instruction pipeline stage that may cause the checking instruction to reach visibility prior to the boundary instruction being made visible and said advanced load ordering unit to stall the checking instruction in the pipeline stage to guarantee that the boundary instruction reaches visibility prior to the checking instruction reaching visibility.

6. The apparatus of claim 1 wherein said advanced load ordering unit detects the boundary instruction and then determines if the checking instruction is present in an instruction pipeline stage that may cause the checking instruction to reach visibility prior to the boundary instruction being made visible and said advanced load ordering unit to fail the checking instruction in the pipeline stage if the boundary instruction may not reach visibility prior to the checking instruction reaching visibility.

7. A processor comprising:
   an advanced load address table to retain an entry associated with a location accessed by an advanced load instruction, the entry utilized to determine if an intervening access to the location is performed by another instruction prior to a corresponding checking instruction to the advanced load instruction is executed;
   an advanced load resolution unit coupled to check the entry in said advanced load address table when the checking instruction is executed and to respond to the checking instruction depending on the entry; and
   an advanced load ordering unit coupled to said advanced load address table to ensure that ordering is maintained when the advanced load instruction is boosted past an ordering setting boundary instruction.

8. The processor of claim 7 wherein said advanced load ordering unit determines if the boundary instruction has not reached visibility when the checking instruction is executed.

9. The processor of claim 8 wherein said advanced load ordering unit stalls the checking instruction until the boundary instruction is guaranteed to reach visibility prior to the checking instruction reaching visibility.

10. The processor of claim 8 wherein said advanced load ordering unit causes the checking instruction to fail if the boundary instruction has not yet reached visibility.

11. The processor of claim 8 wherein said boundary instruction sets an ordering boundary based on an acquire semantic.

12. The processor of claim 7 wherein said advanced load ordering unit detects the boundary instruction and then determines if the checking instruction is present in an instruction pipeline stage that may cause the checking instruction to reach visibility prior to the boundary instruction being made visible and said advanced load ordering unit to stall the checking instruction in the pipeline stage to guarantee that the boundary instruction reaches visibility prior to the checking instruction reaching visibility.

13. The processor of claim 12 wherein said boundary instruction sets an ordering boundary based on an acquire semantic.

14. The processor of claim 7 wherein said advanced load ordering unit detects the boundary instruction and then determines if the checking instruction is present in an instruction pipeline stage that may cause the checking instruction to reach visibility prior to the boundary instruction being made visible and said advanced load ordering unit to fail the checking instruction in the pipeline stage if the boundary instruction may not reach visibility prior to the checking instruction reaching visibility.

15. The processor of claim 14 wherein said boundary instruction sets an ordering boundary based on an acquire semantic.

16. A computer system comprising:
a memory, including a shared memory space accessed by a plurality of processors;
at least one processor coupled to said memory and including:
  (1) an advanced load address table to retain an entry associated with a location in the shared memory space accessed by an advanced load instruction, the entry utilized to determine if an intervening access to the location is performed by another instruction prior to a corresponding checking instruction to the advanced load instruction is executed; and
  (2) an advanced load ordering unit coupled to said advanced load address table to ensure that ordering is maintained when the advanced load instruction is boosted past an ordering setting boundary instruction.

17. The computer system of claim 16 wherein said advanced load ordering unit determines if the boundary instruction has not reached visibility when the checking instruction is executed.

18. The computer system of claim 17 wherein said advanced load ordering unit stalls the checking instruction until the boundary instruction is guaranteed to reach visibility prior to the checking instruction reaching visibility.

19. The computer system of claim 17 wherein said advanced load ordering unit causes the checking instruction to fail if the boundary instruction has not yet reached visibility.

20. The computer system of claim 16 wherein said advanced load ordering unit detects the boundary instruction and then determines if the checking instruction is present in an instruction pipeline stage that may cause the checking instruction to reach visibility prior to the boundary instruction being made visible and said advanced load ordering unit to stall the checking instruction in the pipeline stage to guarantee that the boundary instruction reaches visibility prior to the checking instruction reaching visibility.

21. The computer system of claim 16 wherein said advanced load ordering unit detects the boundary instruction and then determines if the checking instruction is present in an instruction pipeline stage that may cause the checking instruction to reach visibility prior to the boundary instruction being made visible and said advanced load ordering unit to fail the checking instruction in the pipeline stage if the boundary instruction may not reach visibility prior to the checking instruction reaching visibility.

22. A method comprising:
providing a table to retain an entry associated with a location accessed by an advanced load instruction, the entry utilized to determine if an intervening access to the location is performed by another instruction prior to a corresponding checking instruction to the advanced load instruction is executed;
boosting an advanced load instruction past an ordering setting boundary; and
maintaining ordering to ensure validity of the entry by ensuring that a boundary instruction used to set the ordering setting boundary is made visible prior to the checking instruction being made visible.

23. The method of claim 22 wherein said maintaining ordering includes stalling the checking instruction until the boundary instruction is guaranteed to reach visibility prior to the checking instruction reaching visibility.

24. The method of claim 22 wherein said maintaining ordering includes failing the checking instruction until the boundary instruction is guaranteed to reach visibility prior to the checking instruction reaching visibility.

25. The method of claim 22 wherein said maintaining ordering includes stalling the checking instruction if the boundary instruction can be guaranteed to reach visibility prior to the checking instruction reaching visibility, otherwise failing the checking instruction.

26. A method comprising:
providing a table to retain an entry associated with a location accessed by an advanced load instruction, the entry utilized to determine if an intervening access to the location is performed by another instruction prior to a corresponding checking instruction to the advanced load instruction is executed;
accessing the location using the advanced load instruction to load data from the location;
boosting the advanced load instruction past an ordering setting boundary;
maintaining ordering to ensure validity of the entry by ensuring that a boundary instruction used to set the ordering setting boundary is made visible prior to the checking instruction being made visible;
checking the validity of the advanced load instruction by use of the checking instruction.

27. The method of claim 26 wherein said maintaining ordering includes stalling the checking instruction until the boundary instruction is guaranteed to reach visibility prior to the checking instruction reaching visibility.

28. The method of claim 26 wherein said maintaining ordering includes failing the checking instruction until the boundary instruction is guaranteed to reach visibility prior to the checking instruction reaching visibility.

29. The method of claim 26 wherein said maintaining ordering includes stalling the checking instruction if the boundary instruction can be guaranteed to reach visibility prior to the checking instruction reaching visibility, otherwise failing the checking instruction.

* * * * *